United States Patent [19]
Garner et al.

[11] Patent Number: 5,765,002
[45] Date of Patent: Jun. 9, 1998

[54] METHOD AND APPARATUS FOR MINIMIZING POWER CONSUMPTION IN A MICROPROCESSOR CONTROLLED STORAGE DEVICE

[75] Inventors: Richard P. Garner, Cameron; Robert N. Hasbun, Shingle Springs, both of Calif.

[73] Assignee: Intel Corporation, Santa Clara, Calif.

[21] Appl. No.: 938,398

[22] Filed: Sep. 26, 1997

Related U.S. Application Data

[63] Continuation of Ser. No. 414,364, Mar. 13, 1995, abandoned.
[51] Int. Cl.[6] ........................................ G06F 1/32
[52] U.S. Cl. ................... 395/750.01; 395/750.03; 395/750.04; 395/750.06; 365/227
[58] Field of Search .................. 395/750.01, 750.03, 395/750.04, 750.05, 750.06, 430, 428; 365/227, 900; 371/10.2

[56] References Cited

U.S. PATENT DOCUMENTS

| | | | |
|---|---|---|---|
| 4,631,702 | 12/1986 | Korba | 395/560 |
| 5,095,254 | 3/1992 | Ueki | 318/138 |
| 5,297,148 | 3/1994 | Harari et al. | 371/10.2 |
| 5,345,424 | 9/1994 | Landgraf | 365/227 |
| 5,390,350 | 2/1995 | Hung et al. | 395/750 |
| 5,452,251 | 9/1995 | Akaogi et al. | 365/200 |

*Primary Examiner*—Jack B. Harvey
*Assistant Examiner*—Ario Etienne
*Attorney, Agent, or Firm*—Blakely, Sokoloff, Taylor & Zafman

[57] ABSTRACT

A flash electrically-erasable programmable read only memory (EEPROM) device including a flash EEPROM array having circuitry for controlling operations within the flash EEPROM array, a microprocessor for controlling operations external to the flash EEPROM array, circuitry for detecting when operations are taking place within the array, and circuitry for disabling the microprocessor during periods in which operations are taking place in the flash EEPROM array so that power use by the microprocessor is minimized.

20 Claims, 2 Drawing Sheets

METHOD AND APPARATUS FOR MINIMIZING POWER CONSUMPTION IN A MICROPROCESSOR CONTROLLED STORAGE DEVICE

This is a continuation of application Ser. No. 08/414,364, filed Mar. 31, 1995, now abandoned.

BACKGROUND OF THE INVENTION

1. Field Of The Invention

This invention relates to microprocessor controlled storage devices such as flash EEPROM memory arrays, and more particularly, to methods and apparatus for minimizing power consumption in such storage devices.

2. History Of The Prior Art

Recently, microprocessor controlled storage devices such as flash EEPROM memory arrays have been used as a new form of long term storage. A flash EEPROM memory array is constructed of a large plurality of floating-gate metal-oxide-silicon field effect transistor devices arranged as memory cells in typical row and column fashion with circuitry for accessing individual cells and placing the memory transistors of those cells in different memory conditions. Such memory transistors may be programmed by storing a charge on the floating gate. This charge remains when power is removed from the array. The charge level may be detected by interrogating the devices. These arrays may be designed to provide a smaller lighter functional equivalent of a hard disk drive which operates more rapidly and is not as sensitive to physical damage. Flash EEPROM memory arrays are especially useful in portable computers where space is at a premium and weight is extremely important.

In order to allow flash EEPROM memory arrays to accomplish the storage functions normally accomplished by electro-mechanical hard disk drives, one type of flash memory manufactured by Intel Corporation of Santa Clara, Calif., includes a microprocessor which controls many of the functions of the storage device such as loading commands and data which are used by the storage device for accomplishing various housekeeping, setup, and other functions. The same storage device also includes hardware apart from the microprocessor which is especially designed to respond to the commands and utilize the data to accomplish the various read, write, and erase functions necessary to the storage of data using the devices. Power must be supplied for operating all of these components.

Although these memory arrays were initially designed for use in portable computers, their desirable characteristics has allowed their use to expand into other forms of digital devices such a desktop computers and personal digital assistants (PDAs). To a great extent, this expansion has occurred along with the expansion of the PCMCIA bus into these other forms of digital devices. One problem created by this expansion has been that the sources of power available in these different uses vary widely. Thus, with PDAs and very small portable computers, a few double A batteries may supply the power; while desktop computers may provide very large amounts of power.

It is desirable to allow any storage device designed for portable, PCMCIA, or removable use to function with as many different types of digital systems as possible. However, in order to accomplish this, it is necessary that the storage device be capable of utilizing as little power as possible when functioning with low powered systems. To accomplish this, it is desirable to allow such storage devices to function at the lowest level of power possible.

SUMMARY OF THE INVENTION

It is, therefore, an object of the present invention to provide apparatus and a method for minimizing the power used by microprocessor controlled storage devices.

It is another object of the present invention to reduce the power used by components of flash EEPROM memory arrays during the process of reading, writing, and erasing the memory arrays.

These and other objects of the present invention are realized in a flash EEPROM memory array by circuitry and a method for detecting when operations of a storage component of the array are taking place, and an arrangement for stopping the operation of a microprocessor controlling the operation of the array during a period in which the storage functions are being accomplished.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
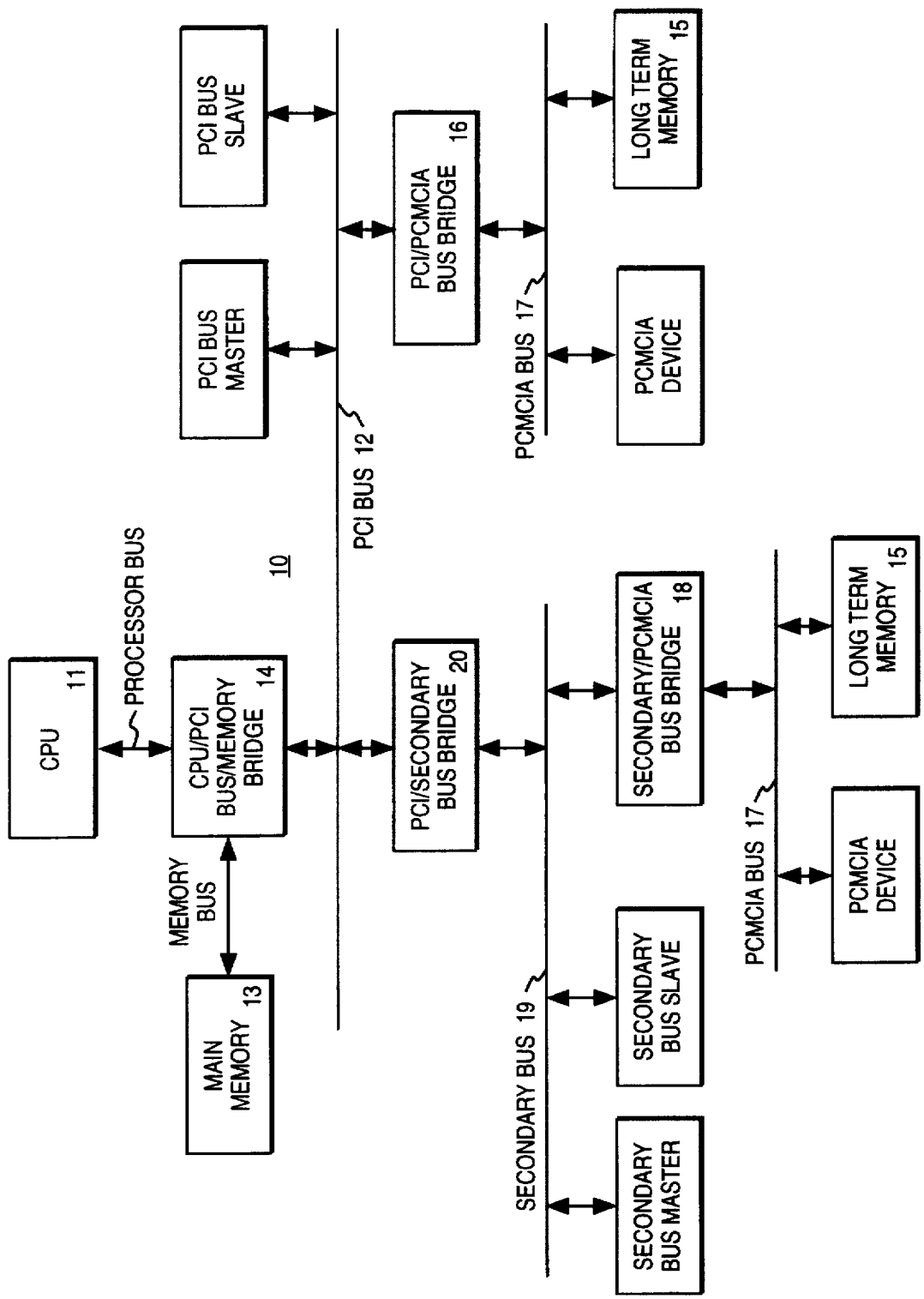
FIG. 1 is a block diagram of a computer system which may utilize the present invention.

Referring now to FIG. 1, there is illustrated a block diagram of a digital system 10 configured in accordance with one embodiment of the present invention. The present invention has application in any system, including a computer system, utilizing microprocessor controlled storage devices such as flash EEPROM memory arrays. The system 10 illustrated includes a central processing unit 11 which executes the various instructions provided to control the operations of the system 10. The central processing unit 11 is joined by a processor bus to a bridge circuit 14 which controls access to an input/output bus 12 adapted to carry information between the various components of the system 10. The bridge 14 is also joined by a memory bus to main memory 13 which is typically constructed of dynamic random access memory arranged in a manner well known to those skilled in the prior art to store information during a period in which power is provided to the system 10. In FIG. 1, the bus 12 is preferably a Peripheral Component Interconnect (PCI) bus or other local bus adapted to provide especially fast transfers of data. This bus is chosen for the illustration of FIG. 1 in order to illustrate different positions at which devices designed in accordance with the present invention may be joined to the system utilizing a PCMCIA bus.

In a typical system 10, various input/output devices are connected as bus master and bus slave circuits to the bus 12. In the present illustration, however, rather than being positioned directly on the bus 12, long term memory 15 may be joined to the PCI bus 12 via a PCMCIA bridge circuit 16 and a PCMCIA bus 17, each of which is designed in accordance with the specifications of the Personal Computer Memory Card International Association (PCMCIA), or by other circuitry for allowing portable or removable use. Alternatively, long term memory 15 may be joined to the system 10 through a PCMCIA bridge circuit 18 and a PCMCIA bus 17 which are joined to secondary bus 19 which is in turn joined to the PCI bus 12 by a PCI to secondary bridge circuit 20. The secondary bus circuit might be of a number of well known types such as an Industry Standard Association (ISA) bus or an Extended Industry Standard Association (EISA).

Other methods of connection to digital systems utilizing PCMCIA buses are well known to those skilled in the art and may be used in practicing the present invention.

Rather than the electro-mechanical hard disk drive which is typically used for long term memory, a flash EEPROM memory array may be used as the long term memory 15. Such a flash EEPROM memory array may be a single bit or a multi-level memory system (a memory system in which a memory cell may store more than one binary bit) and may include circuitry for controlling the operation of the memory array including all of the operations associated with reading, programming (writing), and erasing the memory array.

Figure 2:
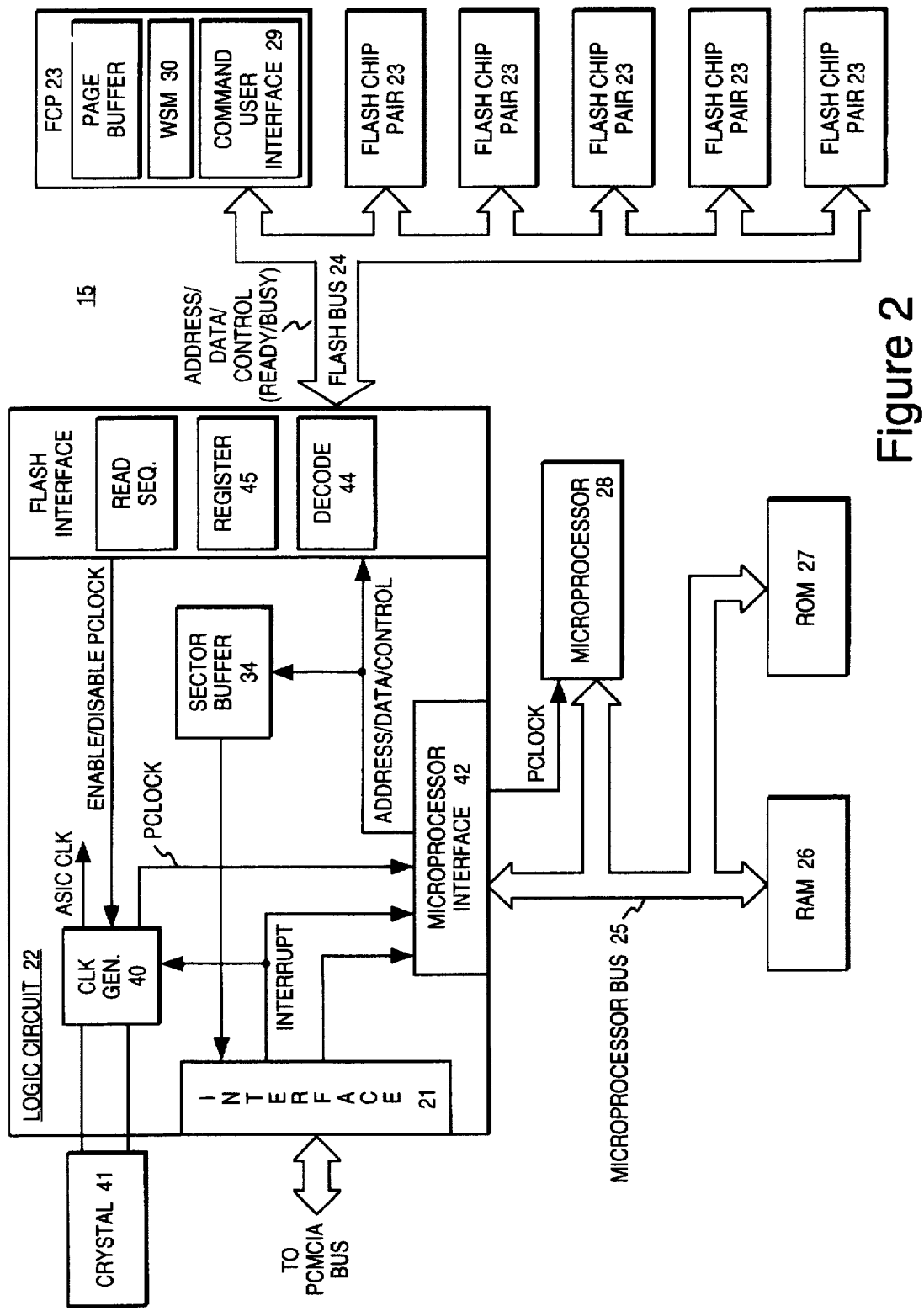
FIG. 2 is a block diagram of a flash EEPROM memory array constructed in accordance with the present invention.

FIG. 2 illustrates in block diagram form a long term memory system 15 such as that illustrated in FIG. 1. In the present case, the memory system 15 is a microprocessor controlled flash EEPROM memory array. The memory system 15 is joined to the bus 12 through an interface 21. The interface 21 provides appropriate circuitry for decoding signals furnished on the PCMCIA bus to a logic circuit 22. In one embodiment, the logic circuit 22 is an application specific integrated circuit (ASIC) which provides logic for implementing and coordinating the various operations of the flash memory system 15 such as reading, writing, erasing, and determining the status of the various portions of the flash EEPROM memory array. The logic circuit 22 functions as a command center and controls operations occurring in a plurality of flash EEPROM chip pairs 23 via a flash bus 24 so that those chips function together as a long term memory system.

The logic circuit 22 is assisted in its operations by a microprocessor 28 which is associated on a microprocessor bus 25 with random access memory 26, and read only memory 27. For the purposes of the present invention, the microprocessor 28, random access memory 26, and read only memory 27 function essentially as a general purpose processor in a manner well known to those skilled in the art. The microprocessor 28 is used, among other things, for implementing commands to the memory system 15 for initiation of various operations of the array. The read only memory 27 is utilized in one embodiment to store processes utilized in minimizing the power required by the memory system 15.

In one embodiment, each pair of flash EEPROM memory chips 23 includes thirty-two blocks of memory transistors. Each chip pair 23 includes a flash EEPROM memory array which in one embodiment includes thirty-two individual blocks each including sixty-four kilobytes of flash EEPROM memory cells with gating/ sensing and decoding circuitry for controlling the bitlines and output sensing devices of the array. Each chip of the pair 23 includes one-half of the memory transistors of the thirty-two blocks and control circuitry for effecting, among other things, read, write, and erase operations in the individual memory cells of the blocks on that chip pair 23. Each flash chip pair 23 is joined to the flash bus 24 by a command user interface 29 which provides command signals to that particular chip pair 23 from the logic circuit 22 of the flash system 15 and controls the transfer of data between the memory system 15 and the chip pair 23. The command user interface 29 is associated with a write state machine 30 which is utilized to control write operations and certain internal operations of the chip pair 23.

Data furnished to each chip pair 23 may be transferred to page buffers 32. Each page buffer 32 provides a direct path to the memory array under control of the write state machine 30. The page buffers 32 allow relatively large amounts of data to be accumulated and then written to the memory array more rapidly than would be possible using individual write operations.

The command user interface 29 of the memory chip pair 23 receives a number of commands from the flash system logic circuit 22. These may be categorized as read commands, write commands, and memory system maintenance commands. The read commands are executed within each chip pair 23 entirely under control of the command user interface. The write commands and many of the maintenance commands are executed by the command user interface using the write state machine 30.

U.S. patent application Ser. No. 969,131, entitled *A Method and Circuitry For A Solid State Memory Disk*, Wells and Hasbun, filed Oct. 30, 1992, and assigned to the assignee of the present invention provides a further description of one arrangement for controlling the operation of a flash EEPROM memory array.

In general, a flash EEPROM memory array is divided into blocks which are connected so that each entire block of memory cells may be erased simultaneously. With N-type complimentary metal-oxide-silicon (CMOS) memory devices, this erasure is typically accomplished by a high voltage value applied simultaneously to the source terminals of all the memory transistors of a block while the gate terminals of the devices are grounded and the drain terminals are floated. Such an erasure places each of the devices in the block into the erased condition. When in the erased condition, a device may be programmed to place a particular charge level on the floating gate. Typically, only one charge level greater than the erased level has been utilized; and this level has been referred to as a "zero" or programmed condition. The erased state has been called a "one" or erased condition. More recently, it has been found that a number of levels of charge in addition to the erased level may be stored on the floating gate of a flash EEPROM cell.

Whether one or more bits are stored in a cell, since all of the source terminals of the memory transistors of a block of the array are joined together, a cell in a charged state cannot be switched to the erased state until the entire block of the array is erased once again. Thus, while an electromechanical hard disk drive typically stores information in a first area of the disk and then rewrites that same area of the disk when the information changes, this is not possible with a flash EEPROM memory array without erasing all of the valid information that remains in that portion of the array along with the invalid (dirty) information. Consequently, in a some arrangements, when the information at a data entry changes, the changed information is written to a new sector on a block of the array containing empty (erased) cells rather than written over the old data; and the old data is marked as invalid. Then, after a sufficient number of sectors on a block have been marked invalid, the entire block is erased.

Because of this arrangement by which data is replaced, each block of the array will after some time have a number of entries which are marked as invalid and cannot be used for storage. Consequently, the array fills with data as the data previously stored is changed; and a point will come when it is necessary to clear the invalid information from a block in order to provide space for new or changed information to be stored. When erasure of a block occurs, all of the remaining valid data stored in the block to be erased is written to a new block; the space from which the data was read is marked invalid; and then the entire invalid block is erased (cleaned up) and put back into use as a clean block of memory.

Since erasure is such a complicated process, it typically takes as much as a second to erase a block of an advanced flash EEPROM array.

Other operations of the memory array which take long periods of time are write operations and read operations in which a long sequence of data is read from the array. Normal read operations are accomplished very quickly.

Because the microprocessor 28 and the chip pairs 23 function independently of one another and during mutually exclusive intervals of time, the time during which data is being written to the array, the time during which extensive amounts of data are being read from the array, and any period in which the array is being erased is time in which power expended by the microprocessor is wasted. In CMOS circuitry such as the circuitry typically utilized in flash EEPROM memory arrays, power is only dissipated during switching operation. Consequently, the operation of the microprocessor 28 in response to the application of clock pulses during these read, write, or erasure operations of the array is a waste of power. This is especially true during erasure of data in flash EEPROM arrays.

The present invention minimizes the loss of power during these periods by disabling the microprocessor clock whenever a write, a sequential read, or an erase operation takes place. In this manner, no power loss occurs in the microprocessor during a period in which operations are being carried on in the flash EEPROM array; and the use of power is significantly reduced.

This is accomplished in the following manner. The logic circuit 22 includes a clock generator circuit 40 which receives input from a crystal 41. The clock generator 40 produces an internal clock signal ASIC CLK for operating the logic circuit 22 and a microprocessor clock signal PCLOCK. The PCLOCK signal is transferred by a microprocessor interface 42 within the logic circuit 22 to the microprocessor 28 and typically allows the microprocessor 28 to run in a state in which it continually polls the ready/busy line from the memory arrays thereby expending power. In order for the array to function in write or erase modes, commands and data must be furnished to the logic circuit 22 by the microprocessor 28. Thus, for example, whenever a write operation is to occur, the microprocessor 28 responds to a write command to transfer the command through the flash interface of the logic circuit 22 to the selected flash pair 23. Once this has taken place, the logic circuit 22 causes the flash pair to accomplish the actual write operation utilizing the write state machine 30. At this point, no further operations by the microprocessor 28 are required so long as the write operation continues. The same situation exists when an erase operation takes place in the flash array. When a long read operation occurs in the array, a read sequencing circuit in the logic circuit 22 functions to transfer large sequences of data being read from the flash array to a sector buffer in the logic circuit 22 once the read command has been given by the microprocessor 28.

In order to disable the PCLOCK signal, the logic circuit 22 includes a decoder circuit 44 which detects the transfer of the write and erase commands through the logic circuit 22. The decode circuit 44 provides a disable signal to the clock generator circuit 40 which disables the generation of the PCLOCK signal and thereby disables the operation of the microprocessor 28 when either of these two commands is detected in the command register. Disabling the PCLOCK and the microprocessor 28 significantly reduces the power output required for operating the memory array.

In a similar manner, when a read sequencing operation occurs, the transfer of data during that operation by the read sequencing circuit of the flash interface to the sector buffer is controlled by a single stop/start bit in a read sequencing control register 45 of the flash interface. The start condition of this bit is used to generate a disabling signal to the clock generator circuit for disabling the PCLOCK signal when a read operation starts.

Thus, whenever any of the three extended read, write, or erase operations commences, a disabling signal is automatically generated and sent to cut off the PCLOCK signal which is necessary to run the microprocessor 28. Thereafter, the microprocessor 28 remains off until it is once again started by the generation of the PCLOCK signal. It should be noted that a normal read operation requires no substantial time, so a read command does not in itself cause the microprocessor to be disabled.

The PCLOCK signal is enabled when a sequential read, write, or erase operation is completed. Each flash chip has a ready/busy line, and a ready signal is sent to the flash interface in the logic circuit 22 when a write or an erase operation is complete. This ready signal is used to turn the PCLOCK signal back on. In order to accomplish this, each of the ready busy lines is monitored; and a PCLOCK enable signal sent to the clock generator circuit 40 whenever one of these signals changes. The start/stop bit which controls the operation of the read sequencer switches to a STOP condition when a read operation has been completed. This STOP signal is also used generate a signal to the clock generator circuit to turn on the PCLOCK signal again. In this manner, the microprocessor 28 is automatically switched back on after a read, write, or erase operation has been completed in the array so that microprocessor is ready to function again.

In order to allow the microprocessor 28 to respond to external signals from the host microprocessor, the logic circuit 22 also responds to any interrupt, external command, or reset on the bus to enable the generation of the PCLOCK signal by the clock generator circuit 40. In this way the microprocessor 28 is able to respond to interrupts, resets, and other commands even though the PCLOCK signal has been disabled automatically at the start of a read, write, or erase operation in the array.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A memory apparatus comprising:

a nonvolatile memory array;

a microprocessor coupled to the nonvolatile memory array for issuing commands to the nonvolatile memory array; and logic circuitry that disables the microprocessor when any one of a sequential read operation a write operation and an erase operation is commenced in response to a command issued by the microprocessor.

2. The memory apparatus of claim 1 wherein the logic circuitry further comprises:

decoder circuitry for detecting if the command is one of a write command and an erase command.

3. The memory apparatus of claim 1 wherein the logic circuitry further comprises:

read sequencing circuitry for transferring data from the nonvolatile memory array to the logic circuitry in response to a sequential read command issued by the microprocessor; and a read control register for indicating the start of the sequential read operation.

4. The memory apparatus of claim 1 wherein the logic circuitry further comprises:

a clock generator for providing a microprocessor clock signal to the microprocessor, wherein the microprocessor clock signal is disabled when any one of the sequential read operation, the write operation, and the erase operation is commenced.

5. The memory apparatus of claim 1 wherein the logic circuitry enables the microprocessor upon completion of execution of the command.

6. The memory apparatus of claim 1 wherein the logic circuitry further comprises:

a clock generator for providing a microprocessor clock signal to the microprocessor, wherein the microprocessor clock signal is disabled when any one of the sequential read operation, the write operation, and the erase operation is commenced, wherein the microprocessor clock signal is enabled upon completion of execution of the command.

7. A computer system comprising:

a host processor;

a memory apparatus coupled to the host processor, comprising:

a nonvolatile memory array;

a microprocessor coupled to the nonvolatile memory array for issuing commands to the nonvolatile memory array; and logic circuitry that disables the microprocessor when any one of a sequential read operation, a write operation, and an erase operation is commenced in response to a command issued by the microprocessor.

8. The memory apparatus of claim 7 wherein the logic circuitry further comprises:

decoder circuitry for detecting if the command is one of a write command and an erase command.

9. The memory apparatus of claim 7 wherein the logic circuitry further comprises:

read sequencing circuitry for transferring data from the nonvolatile memory array to the logic circuitry in response to a sequential read command issued by the microprocessor; and a read control register for indicating the start of the sequential read operation.

10. The memory apparatus of claim 7 wherein the logic circuitry further comprises:

a clock generator for providing a microprocessor clock signal to the microprocessor, wherein the microprocessor clock signal is disabled when any one of the sequential read operation, the write operation, and the erase operation is commenced.

11. The memory apparatus of claim 7 wherein the logic circuitry enables the microprocessor upon completion of execution of the command.

12. The memory apparatus of claim 7 further comprising:

a bus coupling the memory apparatus and the host processor, wherein the logic circuitry enables the microprocessor in response to external signals on the bus from the host processor.

13. The memory apparatus of claim 12 wherein the logic circuitry enables the microprocessor in response to at least one of an interrupt, and external command, and a reset signal on the bus.

14. The memory apparatus of claim 7 wherein the logic circuitry further comprises:

a clock generator for providing a microprocessor clock signal to the microprocessor, wherein the microprocessor clock signal is disabled when any one of the sequential read operation, the write operation, and the erase operation is commenced, wherein the microprocessor clock signal is enabled upon completion of execution of the command.

15. The memory apparatus of claim 7 wherein the logic circuitry further comprises:

a clock generator for providing a microprocessor clock signal to the microprocessor, wherein the microprocessor clock signal is disabled when any one of the sequential read operation, the write operation, and the erase operation is commenced, wherein the microprocessor clock signal is enabled upon completion of execution of the command, wherein the microprocessor clock signal is enabled in response to at least one of an interrupt, an external command, and a reset signal on a bus coupling the host processor and the memory apparatus.

16. The memory apparatus of claim 1 wherein the nonvolatile memory array comprises flash electrically erasable programmable read only memory (EEPROM).

17. The memory apparatus of claim 7 wherein the nonvolatile memory array comprises flash electrically erasable programmable read only memory (EEPROM).

18. A method of controlling microprocessor power consumption, comprising the steps of:

a) detecting operations within a nonvolatile memory array;

b) disabling a microprocessor coupled to the nonvolatile memory array if the detected operations include any one of a sequential read operation, a write operation, and an erase operation commenced in response to a command issued by the microprocessor.

19. The method of claim 18 wherein step b) further comprises the step of disabling a microprocessor clock signal.

20. The method of claim 18 wherein the nonvolatile memory array comprises flash electrically erasable programmable read only memory (EEPROM).

* * * * *